Dec. 2, 1952 J. H. ABBOTT 2,620,420
WELDING MACHINE
Filed Feb. 11, 1952 4 Sheets-Sheet 1

INVENTOR:
JOHN H. ABBOTT
BY HIS ATTORNEYS
HARRIS, KIECH, FOSTER & HARRIS
By Lawrence F. Kiech Dec. 2, 1952      J. H. ABBOTT      2,620,420
WELDING MACHINE
Filed Feb. 11, 1952      4 Sheets-Sheet 2
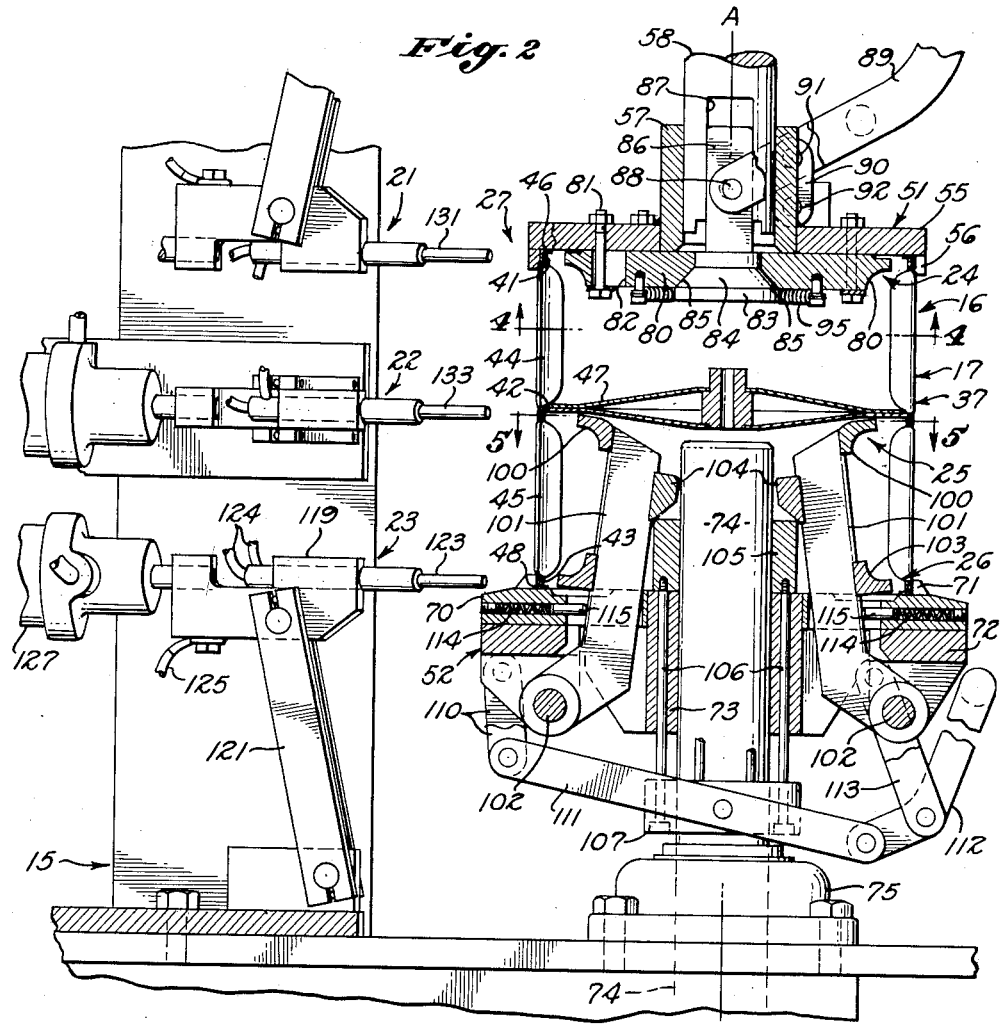
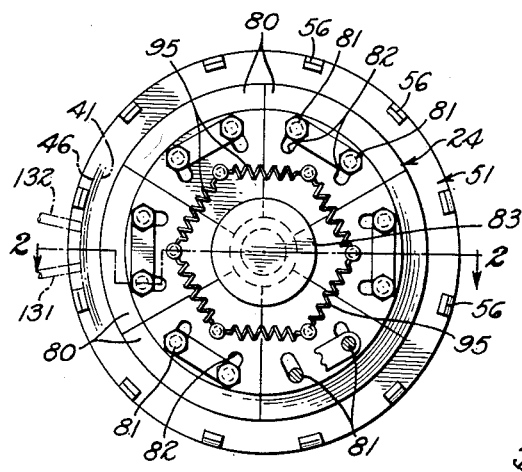
INVENTOR:
JOHN H. ABBOTT
BY HIS ATTORNEYS
HARRIS, KIECH, FOSTER & HARRIS Dec. 2, 1952 J. H. ABBOTT 2,620,420
WELDING MACHINE Filed Feb. 11, 1952 4 Sheets-Sheet 3

INVENTOR:
JOHN H. ABBOTT
BY HIS ATTORNEYS
HARRIS, KIECH, FOSTER & HARRIS
By Laurence F. Kiech Dec. 2, 1952        J. H. ABBOTT        2,620,420

WELDING MACHINE

Filed Feb. 11, 1952        4 Sheets-Sheet 4

INVENTOR:
JOHN H. ABBOTT
BY HIS ATTORNEYS
HARRIS, KIECH, FOSTER & HARRIS
By *Lawrence F. Kiech*

Patented Dec. 2, 1952

2,620,420

UNITED STATES PATENT OFFICE 2,620,420

WELDING MACHINE

John H. Abbott, South Gate, Calif., assignor to Utility Appliance Corporation, Los Angeles, Calif., a corporation of California Application February 11, 1952, Serial No. 271,050

17 Claims. (Cl. 219—4)

1

The present invention relates in general to an apparatus for fabricating articles and, more particularly, to an apparatus for assembling articles of sheet metal by spot welding the elements of the articles together. Still more particularly, the invention relates to an apparatus for welding together elements of a tubular work piece, the invention finding particular utility in assembling the elements of such tubular work pieces as the fans or rotors, commonly termed "wheels," which are incorporated in certain types of centrifugal blowers and I prefer to consider the invention in this connection herein for convenience in disclosing same. However, it will be understood that the invention is susceptible of other applications and that I do not intend to be limited to the particular illustrative application disclosed herein.

In general, a primary object of the invention is to provide a welding apparatus or machine for simultaneously spot welding together elements of a tubular work piece at a plurality of axially spaced points on the work piece.

More particularly, a primary object of the invention is to provide a welding apparatus which includes a frame providing an operating station, retaining means adapted to hold the elements of the tubular work piece in assembled relation and rotatable relative to the frame about the axis of the work piece so as to move successive portions of the work piece to the operating station, intermittently-operating indexing means for rotating the retaining means, and a plurality of axially spaced welding tools carried by the frame adjacent the operating station and movable from retracted positions to extend positions wherein they engage the work piece at a plurality of axially spaced points.

Another object of the invention is to provide a welding tool which is adapted to make two spot welds simultaneously, a related object being to provide an apparatus wherein the two electrodes of each welding tool are connected in series and wherein the work piece is adapted to contact an electrically conductive backing structure on the opposite side of the work piece from the welding tool so as to establish a current path between the two electrodes.

An important object of the invention is to provide radially expansible and contractible backing means carried by the retaining means in axial alignment therewith and adapted to be encompassed by the tubular work piece held by the retaining means, the backing means being expansible into engagement with the interior of the work piece and being contractible out of engagement therewith to permit installation of the work piece in the retaining means prior to welding and to permit removal of the work piece after welding has been completed.

Another object is to provide such a backing means which, for example, includes three radially expansible and contractible backing structures respectively adapted to engage the interior of the tubular work piece at three axially spaced zones, there being three welding tools respectively adapted to engage the exterior of the tubular work piece opposite the three zones. Each backing structure includes electrical conductor means adapted to contact the interior of the work piece so that current may flow from one electrode of the corresponding welding tool through the work piece, through the electrical conductor means of the corresponding backing structure, and through the work piece again to the other electrode of the welding tool, thereby making two spot welds at once.

Another object is to provide cam means for expanding the backing structures into engagement with the interior of the work piece.

Another object is to provide a retaining means which includes two axially spaced retainers or heads adapted to receive the tubular work piece therebetween, one of the retainers being axially movable relative to the other to permit insertion of the work piece between the retainers and to permit removal thereof from between the retainers.

Another object is to provide a welding apparatus wherein two of the backing structures are carried by one of the retainers and the third backing structure is carried by the other.

Still another object is to provide an apparatus wherein the two backing structures carried by one of the retainers are divided into a plurality of radially movable, electrically conductive segments carried by pivoted arms common thereto, a cam means being adapted to engage all of the pivoted arms to expand both of the backing structures carried by such retainer into engagement with the interior of the work piece.

Another object is to make the single backing structure carried by the other retainer in the form of a plurality of radially movable, electrically conductive segments, and to provide a cam means engageable with all of such segments for expanding the backing structure into engagement with the interior of the work piece.

Another object is to provide an apparatus wherein the aforementioned intermittently-operating indexing means is connected to one of the retainers of the retaining means, the other retainer being driven by the first through the work piece held by the two retainers.

The foregoing objects and advantages of my invention, together with various other objects and advantages thereof which will become apparent, may be attained with the exemplary embodiment which is illustrated in the accompanying drawings and which is described in detail herein. Referring to the drawings:

Fig. 2 is an enlarged, fragmentary sectional view illustrating various elements of the apparatus in their inoperative positions, Fig. 2 being taken along the arrowed line 2—2 of Fig. 4;

Figure 5:
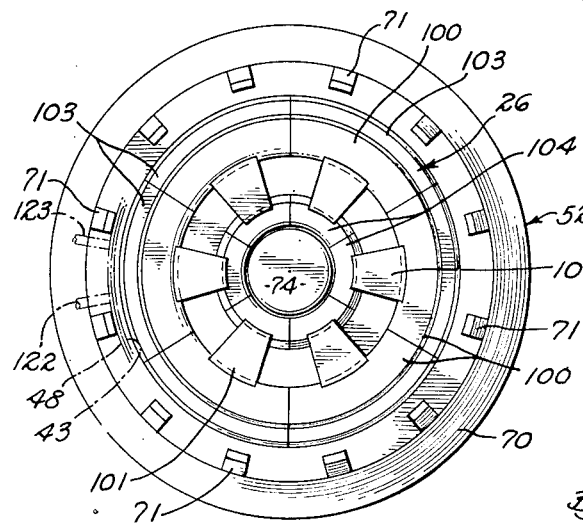
Figure 6:
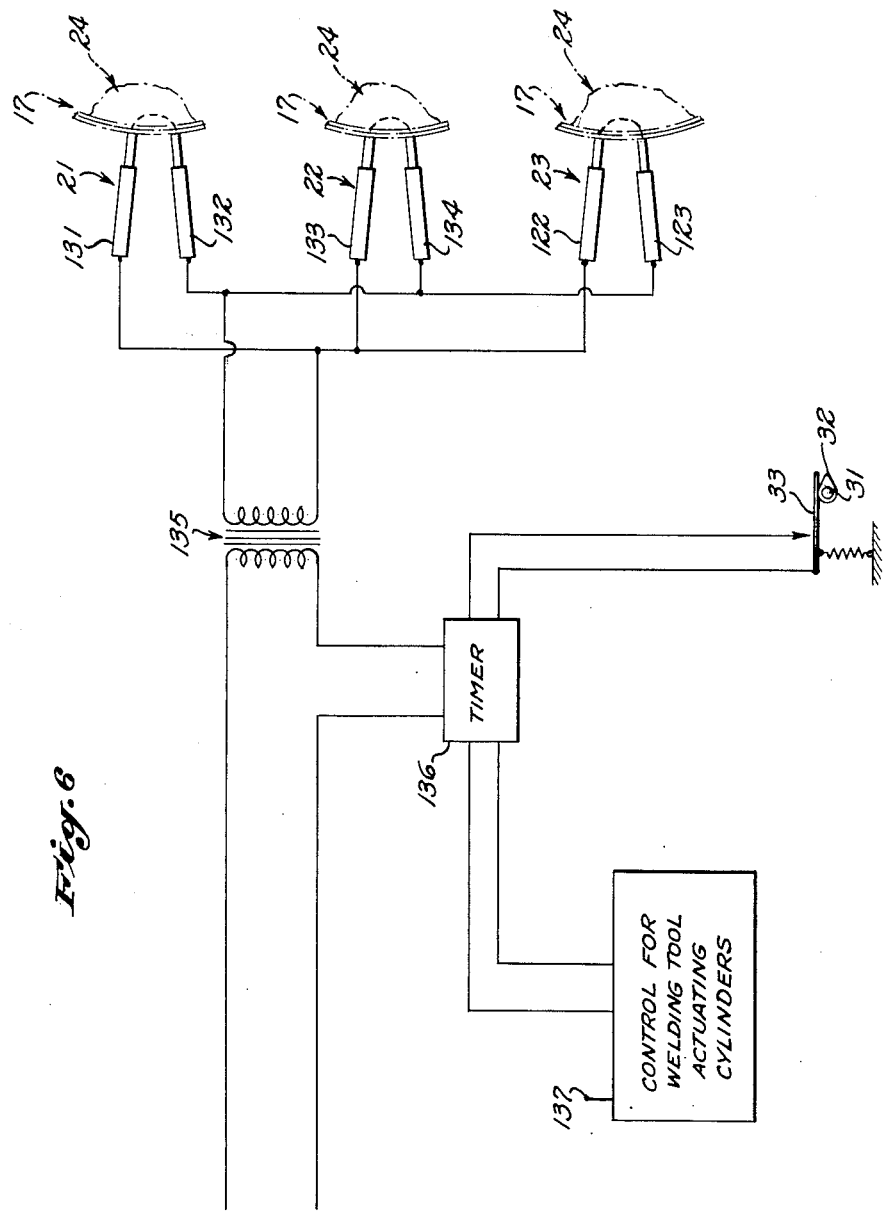

Figs. 4 and 5 are sectional views respectively taken along the arrowed lines 4—4 and 5—5 of Fig. 2; and Fig. 6 is a diagrammatic view showing an electrical circuit of the apparatus.

Figure 1:
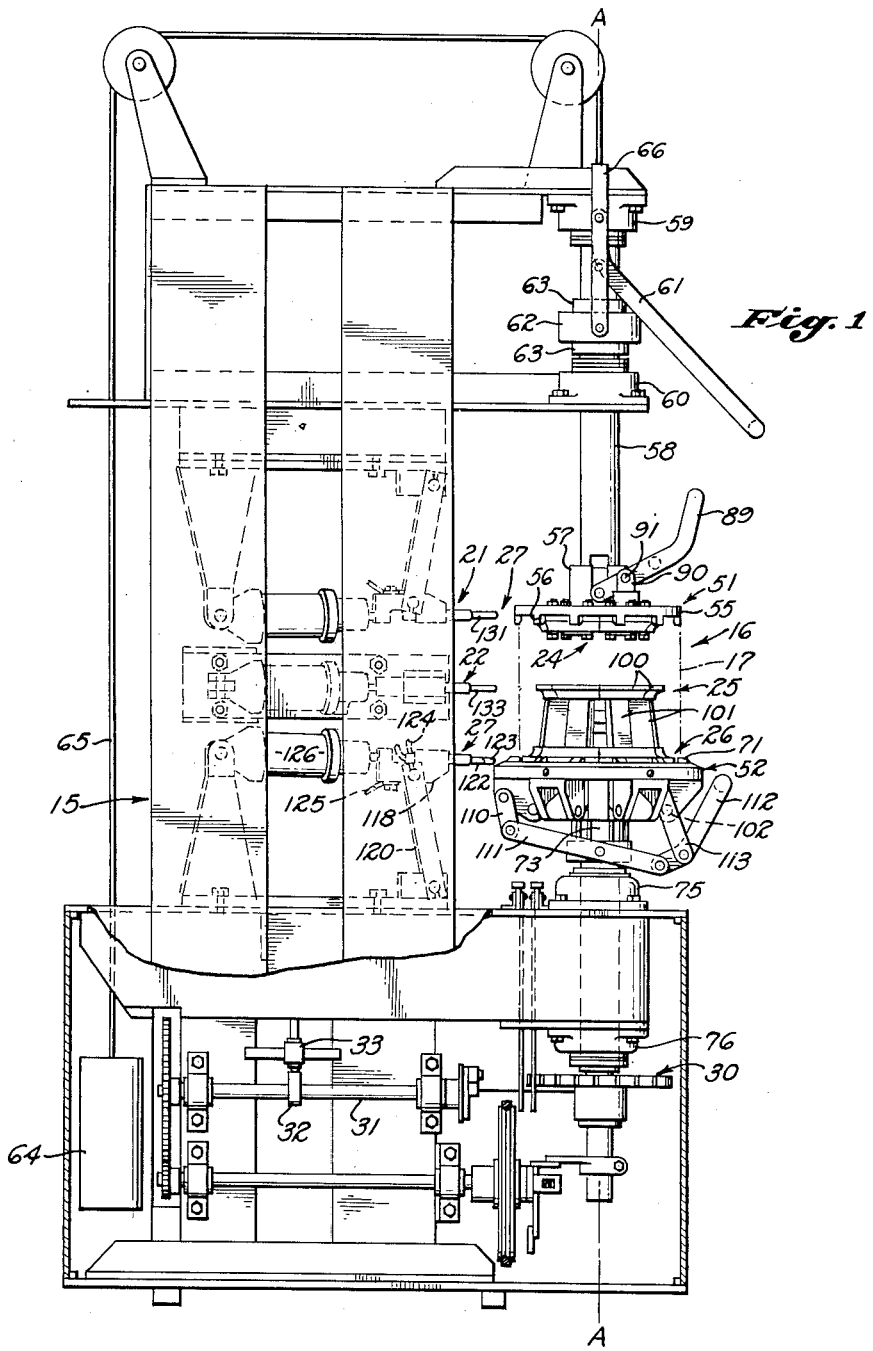
Fig. 1 is an elevational view, partially in section, of a welding apparatus or machine which embodies the invention.

Referring particularly to Fig. 1 of the drawings, the welding apparatus includes a supporting structure or frame, indicated generally by the numeral 15, which carries rotatable retaining means 16 for holding in assembled relation elements of a tubular work piece 17, shown in phantom, which are to be welded together by the apparatus. In the particular construction illustrated, the elements of the work piece 17 are to be welded together at three axially spaced points or zones, and three welding tools or guns 21, 22 and 23 are carried by the frame 15 adjacent the retaining means 16 and respectively opposite the three welding zones. The welding tools 21 to 23 are movable between retracted positions, Figs. 1 and 2, wherein they are spaced from the work piece 17 and extended positions, Fig. 3, wherein they engage the exterior of the work piece. Carried by the retaining means 16 within the tubular work piece 17 are three backing structures 24, 25 and 26 respectively disposed opposite the welding tools 21, 22 and 23, the backing structures being expansible and contractible so that they may be expanded into engagement with the interior of the tubular work piece, and may be contracted out of engagement therewith to permit installation of the work piece in the retaining means and removal thereof from the retaining means. With the welding tools 21 to 23 in their retracted positions, the retaining means 16 may be rotated to bring successive portions of the tubular work piece 17 into positions to be engaged by the welding tools. Since the backing structures 24 to 26 are carried by the retaining means 16, the backing structures rotate with the retaining means and it is unnecessary to contract the backing structures when rotating the retaining means to move successive portions of the work piece into positions to be engaged by the welding tools. As a matter of convenience, movement of successive portions of the work piece into positions to be engaged by the welding tools will be referred to hereinafter as movement of the elements to an "operating station" adjacent which the welding tools are located, the operating station being indicated generally by the numeral 27.

The welding apparatus also includes intermittently-operating indexing means for rotating the retaining means 16 step-by-step so as to move successive portions of the work piece to the operating station 27 in a step-by-step manner, the indexing means being indicated generally by the numeral 30 and being completely described in my Patent No. 2,498,905 for Welding Apparatus, granted February 28, 1950, so that a detailed description of the indexing means herein is unnecessary. Briefly, the indexing means 30 comprises a ratchet and pawl structure driven by a shaft 31 which rotates through one revolution for each increment of advance of the retaining means 16. For a purpose to be discussed hereinafter, the shaft 31 carries a cam 32 which actuates a switch 33 once for each revolution of the shaft 31, or once for each increment of advance of the retaining means 16 by the indexing means 30.

Figure 3:
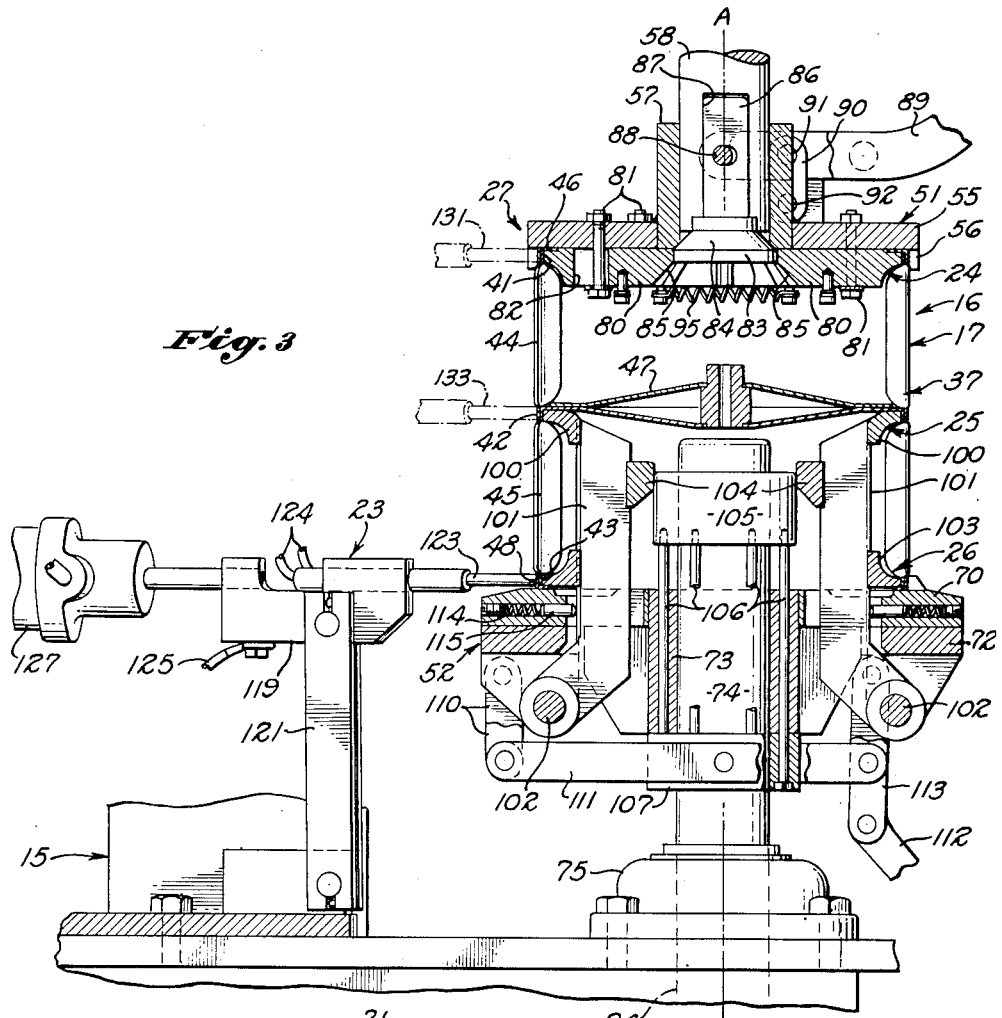
Fig. 3 is a view similar to Fig. 2, but showing the aforementioned elements of the apparatus in their operative positions.

As hereinbefore suggested, the apparatus of the invention is particularly applicable to spot welding blower wheels and, in order to facilitate disclosing the structure and operation of the apparatus, it is desirable to consider first a typical blower wheel which the apparatus is capable of assembling, the blower wheel also being identified by the reference numeral 17 since it is a tubular work piece. Referring particularly to Figs. 2 and 3 of the drawings, the blower wheel illustrated therein is similar to the one disclosed in co-pending application Serial No. 198,692, filed December 1, 1950 in my name and in the name of Stanley F. Skafte, reference to which is hereby made. It will be understood, however, that the present invention is not limited to application to such a blower wheel.

Referring now to Fig. 2 or 3 of the drawings, the blower wheel illustrated therein includes a cylindrical element 37 having an integral annular band 41 at one end, an integral annular band 42 intermediate its ends, and an integral annular band 43 at its other end. Circumferentially spaced, longitudinally extending blades or vanes 44 are formed in the cylindrical element 37 between the annular bands 41 and 42, and similar vanes 45 are formed between the annular bands 42 and 43. An annular rim 46 is telescoped over the annular band 41, this rim being angle shaped in cross section and having a flange contacting and adapted to be spot welded to the annular band 41. A central hub or hub structure 47 adapted to receive a shaft, not shown, is disposed within the cylindrical element 37 and is provided with a flange contacting and adapted to be spot welded to the intermediate annular band 42. A rim 48 similar to the rim 46 is telescoped over the annular band 43 and is also provided with a flange contacting the annular band 43 and adapted to be spot welded thereto. When the cylindrical element 37, the rims 46 and 48 and the hub 47 have been assembled, the rims, being telescoped over the ends of the cylindrical element, hold the cylindrical element in the desired configuration. The vanes 44 and 45 hold the central hub 47 in place once the rims 46 and 48 have been installed. Thus, the preassembled blower wheel or work piece 17 may be installed in the retaining means 16 as a unit, the retaining means being adapted to hold the elements in assembled relation during the welding operation as will be described in more detail in the following paragraphs.

Considering the welding apparatus in more detail, the retaining means 16 includes a pair of heads or retainers 51 and 52 which are spaced apart along an axis A—A coinciding with the axis of the tubular work piece or blower wheel 17 and which are rotatable about such axis, the retainers being adapted to receive the blower wheel therebetween and being adapted to hold the elements thereof in assembled relation as they are spot welded together. The retainer 51 is movable axially relative to the retainer 52 to permit insertion of the blower wheel 17 between the two retainers and to permit removal of the blower wheel from between the retainers.

As best shown in Figs. 1 and 2, the retainer 51 includes an annular disc 55 having peripheral, depending, circumferentially spaced lugs 56 adapted to receive the annular rim 46 of the blower wheel 17. Thus, when the retainer 51 is moved axially toward the retainer 52, the lugs 56 encompass the upper end of the blower wheel 17 to hold it in place. The disc 55 is provided with a central sleeve or hub 57 which is pressed onto an axial shaft 58, the latter being journalled in bearings 59 and 60 which are carried by the frame 15 and which also permit movement of the shaft 58 along the axis A—A. As best shown in Fig. 1 of the drawings, a handle 61 is suitably connected to a collar 62 in which the shaft 58 may rotate, axial movement of the collar 62 relative to the shaft being prevented by collars 63 on either side thereof which are fixed to the shaft. Upward movement of the handle 61 is communicated to the collar 62 to move the retainer 51 axially upwardly, the retainer 51 being counterweighted by a counterweight 64 connected to the collar 62 through a cable 65 and a yoke 66, all of this structure being described in detail in my aforementioned patent, reference to which is hereby made for a detailed description.

Thus, whenever it is necessary to insert a blower wheel 17 between the retainers 51 and 52, or to remove a blower wheel from therebetween, it is merely necessary to move the handle 61 upwardly to separate the retainers 51 and 52 a distance sufficient to permit this.

Considering the retainer 52, it includes an annular disc 70 having upwardly extending, circumferentially spaced lugs 71 adapted to receive the annular rim 48 of the blower wheel 17 so that, when the retainer 51 is moved downwardly into engagement with the blower wheel, the lugs 56 and 71 firmly hold the blower wheel in place for the subsequent welding operation. The disc 70 of the retainer 52 is carried by a base 72 having a central hub 73 pressed onto a shaft 74 which is journalled in bearings 75 and 76 carried by the frame 15. The indexing means 30 is connected to the shaft 74 and rotates it step-by-step so as to rotate the retainer 52 in a similar manner, such step-by-step rotation of the retainer 52 being communicated to the blower wheel 17 held between the retainers 51 and 52. In turn, the blower wheel 17 itself communicates such step-by-step rotation to the retainer 51, the shaft 58 of the latter being freely rotatable in its bearings 59 and 60. Thus, the intermittently-operating indexing means 30 rotates the blower wheel 17 in a step-by-step manner to bring successive portions thereof into the operating station 27.

Considering the backing structures 24 to 26, the backing structure 24 is carried by the retainer 51 and the backing structures 25 and 26 are carried by the retainer 52. As best shown in Figs. 2 and 4, the backing structure 24 includes a plurality of radially movable, pie-shaped segments 80 which are carried by the disc 55 of the retainer 51 by bolts 81 extending through radial slots 82 in the segments. The radially movable segments 80 are formed of an electrically conductive material, such as copper, for example, and are movable radially outwardly into engagement with the annular band 41 of the blower wheel 17, as best shown in Fig. 3. When expanded into engagement with the annular band 41 in this manner, the backing structure 24 serves to back up the welding tool 21 and, as will be discussed in more detail hereinafter, provides a current path for the current flowing through the welding tool.

Cam means is provided to expand the backing structure 24, this cam means comprising an axially movable cam 83 having a head which is provided with a beveled annular face 84 adapted to engage beveled inner ends 85 of the segments 80. As will be apparent, when the cam 83 is moved upwardly, it moves the segments 80 radially outwardly so as to expand the backing structure 24 into engagement with the interior of the blower wheel 17, the cam 83 being provided with a stem 86 which is slidable in a slot 87 in the shaft 58. Pivotally connected to the stem 86 at 88 is a handle 89 which, in turn, is pivotally connected to a link 90 at 91, the link being pivotally connected to the retainer 51 at 92. As will be apparent, downward movement of the handle 89 results in upward movement of the cam 83 to expand the backing structure 24 into engagement with the interior of the blower wheel 17 as hereinbefore described.

In order to return the segments 80 of the backing structure 24 to their inner positions when the handle 89 is moved upwardly to lower the cam 82, tension springs 95 interconnect the segments 80, as best shown in Fig. 4, and urge the segments inwardly.

The backing structures 25 and 26 are, as previously indicated, carried by the retainer 52, the backing structure 25 being adapted to engage the flange on the hub 47 of the blower wheel 17 and the backing structure 26 being adapted to engage the band 43 of the blower wheel. The backing structure 25 includes, as best shown in Fig. 5, a plurality of circular segments 100 which are mounted on pivoted arms 101, respectively. The arms 101 extend downwardly through openings in the disc 70 and the base 72 and are pivotally connected to the base by pins 102. The backing structure 26 also includes a plurality of circular segments 103 respectively carried by the pivoted arms 101.

As will be apparent, the arms 101 are so pivoted that the segments 101 and 103 carried thereby move radially outwardly upon outward pivotal movement of the arms, thereby expanding the backing structures 25 and 26 into engagement with the interior of the blower wheel 17. The arms 101 carry cam elements 104 on their inner sides, these cam elements being engageable by a cam 105 having the form of a collar slidable on the shaft 74. Threaded into the collar or cam 105 are rods 106 which are axially slidable through holes in the hub 73 of the base 72, these rods being connected at their lower ends to a collar 107 slidable on the shaft 74. Thus, as the collar 107 is moved upwardly, its movement is communicated by the rods 106 to the cam 105, which acts on the cam elements 104 to spread the pivoted arms 101, the cam elements being beveled for this purpose. Such spreading of the pivoted arms results in expansion of the backing structures 25 and 26 into engagement with the interior of the blower wheel 17.

Considering the actuating means for the cam 105, a link 110 is pivotally connected to the base 72 of the retainer 52, a lever 111 being pivotally connected at one end to this link and being pivotally connected intermediate its ends to the collar 107. Pivotally connected to the other end of the lever 111 is a handle 112, a link 113 being pivotally connected at one end to the handle intermediate the ends of the handle. The other end of the link 113 is pivotally connected to the base 72. As will be seen by comparing Figs. 2 and 3, downward movement of the handle 112 results in upward movement of the collar 107 to cam the pivoted arms 101 outwardly so as to expand the backing structures 25 and 26. The links 110 and 113, the lever 111 and the handle 112 cooperate to provide a toggle which retains the cam 105 in its uppermost position until the toggle is broken by upward movement of the handle 112 by the operator. When the cam 105 is thus moved downwardly, the pivoted arms 101 are moved inwardly by springs 114 so as to contract the backing structures 25 and 26. The springs 114 are compression springs disposed in radial bores in the disc 70 and bearing against pins 115 which engage the respective pivoted arms 101.

Thus, it will be apparent that after the operator of the welding apparatus has installed a blower wheel to be welded in the retaining means 16 and has closed the retaining means by moving the retainer 51 downwardly, the backing structures 24 to 26 may be expanded readily into engagement with the interior of the blower wheel by means of the handles 89 and 112. When this has been accomplished, the blower wheel is ready for welding and the welding tools 21 to 23 will now be described in detail.

The welding tools 21 to 23 are identical and are mounted and actuated in substantially the same way so that only one of them needs be described in detail, the welding tool 23 having been selected for description as a matter of convenience. The welding tool 23 comprises two electrode holders 118, Fig. 1, and 119, Fig. 2, the electrode holder 119 being disposed behind the electrode holder 118 in Fig. 1. The electrode holders 118 and 119 are pivotally connected to arms 120 and 121, respectively, which are pivotally connected to the frame 15. The electrode holders 118 and 119 carry electrodes 122 and 123, respectively, the electrodes being of any suitable construction. If cooling of the electrodes is desired, connections 124 for a coolant may be provided. Electrical connections to the electrodes are indicated at 125, the circuit in which the electrodes are connected being described hereinafter.

The electrode holders 118 and 119 are movable between retracted and extended positions by virtue of the pivotal mounting thereof, the retracted positions of the electrode holders 118 and 119 being shown in Figs. 1 and 2, respectively. The extended position of the electrode holder 119 is shown in Fig. 3. When the electrode holders 118 and 119 are in their extended positions, the electrodes 122 and 123 engage the annular rim 48 at two circumferentially spaced points, as shown in Figs. 3 and 5. As will be described in more detail hereinafter, the electrodes 122 and 123 are series-connected so that two spot welds are formed simultaneously.

In order to move the electrode holders 118 and 119 between their extended and retracted positions, actuating means illustrated as including two air cylinders 126 and 127 is provided, the air cylinders 126 and 127 being connected to the electrode holders 118 and 119, respectively, and to the frame 15. Thus, whenever the air cylinders 126 and 127 are energized, they move the electrode holders 118 and 119 from their retracted positions to their extended positions to bring the electrodes 122 and 123 into engagement with the exterior of the blower wheel 17.

As hereinbefore discussed, the welding tools 21 and 22 are similar in construction, mounting and actuation to the welding tool 23 so that they will not be described in detail, it being sufficient to point out that the welding tool 21 has two electrodes 131 and 132 and the welding tool 22 has two electrodes 133 and 134.

The foregoing completes the description of the structure of the welding apparatus and the electrical circuit for controlling the operation thereof will now be considered. Referring particularly to Fig. 6 of the drawings, the electrodes 122 and 123 of the welding tool 23 are connected in series with the secondary winding of a transformer 135, the same being true of the electrodes 131 and 132 of the welding tool 21 and the electrodes 133 and 134 of the welding tool 22. The primary winding of the transformer 135 is connected to a source of alternating current through a timer 136. As is well known in the art, the timer controls the duration of the welding current supplied to the electrodes, and since any suitable timer may be employed, the details thereof are not shown. The timer 136 also controls the operation of a control means 137 for the air cylinders for actuating the welding tools, the control means being shown only diagrammatically. For example, the control means 137 may include an electrically operated selector valve similar to that illustrated in detail in my aforementioned patent. The timer 136 is controlled by the aforementioned switch 33, which is operated once for every increment of advance of the blower wheel 17 by the cam 32 on the shaft 31 which drives the indexing means 30. Thus, the cam 32 closes the switch 33 to operate the timer 136 each time the blower wheel 17 is advanced one increment.

Considering the over-all operation of the welding apparatus, it will be assumed that the operator has placed the elements of the blower wheel 17 in the retaining means 16 in assembled relation. When the retainer 51 is moved downwardly by the handle 61, the retainers 51 and 52 securely hold the assembled blower wheel therebetween. Thereafter, the operator actuates the two cams 83 and 105 by means of the handles 89 and 112 to expand the backing structures 24 to 26 into engagement with the interior of the blower wheel in the manner hereinbefore described. Thereafter, the operator sets the intermittently-operating indexing means 30 in operation so that the indexing means rotates the periphery of the blower wheel through the operating station 27 in a step-by-step manner. At the end of each increment of advance of the blower wheel, the timer 136 is energized to energize the control means 137 for the actuating cylinders connected to the welding tools 21 to 23, whereupon the welding tools are moved to their extended positions so that the electrodes carried thereby engage the exterior of the blower wheel, the electrodes of the welding tools 21 and 23 being inserted between the lugs 56 and 71, respectively, for retaining the blower wheel. The timer 136 also establishes current flow to the transformer 135 so that current flows from one electrode of each welding tool to the other by flowing first through the elements of the blower wheel to be welded together, through the corresponding backing structure, and through the elements to be welded together again, thereby producing two spot welds at once. Thereafter, the timer interrupts the flow of current to the electrodes and causes the control means 137 to retract the welding tools, whereupon the indexing means 30 advances the blower wheel another increment.

The foregoing sequence of operations is repeated until the retaining means 16 has been rotated through one complete revolution by the indexing means 30, by which time all of the elements of the blower wheel have been spot welded together. The apparatus can be caused to stop automatically at this point in a manner similar to that disclosed in my aforementioned patent. Upon completion of the welding operation, the operator contracts the three backing structures 24 to 26 and separates the retainers 51 and 52 so that the completed blower wheel may be removed. Thereafter, the elements of another blower wheel to be welded together may be placed in the retaining means, preferably, but not necessarily, in assembled relation, and the foregoing cycle repeated.

Although I have disclosed an exemplary embodiment of the invention herein for purposes of illustration, it will be understood that various changes, modifications and substitutions may be incorporated therein without necessarily departing from the spirit of the invention.

I claim as my invention:

1. In an apparatus of the character described, the combination of: a frame providing an operating station; retaining means carried by said frame adjacent said operating station for holding a tubular work piece, said retaining means being rotatable about the axis of a tubular work piece held thereby to move successive portions of the periphery of the work piece to said operating station; means for rotating said retaining means; a radially expansible and contractible backing structure carried by said frame in axial alignment with said retaining means and adapted to be encompassed by a tubular work piece held by said retaining means, said backing structure being expansible into engagement with the interior of the work piece and being contractible out of engagement therewith to provide for removal of the work piece from said retaining means; means for expanding and contracting said backing structure; a working tool carried by said frame adjacent said operating station and externally of a tubular work piece held by said retaining means and movable radially relative thereto between extended and retracted positions, said tool being adapted to engage the exterior of the work piece radially opposite said backing structure when it is in said extended position, and being spaced from the work piece when it is in said retracted position; and means for moving said tool between said extended and retracted positions.

2. An apparatus as defined in claim 1 wherein said backing structure is connected to said retaining means so as to be rotatable therewith.

3. In a welding apparatus, the combination of: a frame providing an operating station; retaining means carried by said frame adjacent said operating station for holding a tubular work piece, said retaining means being rotatable about the axis of the tubular work piece to move successive portions of the work piece to said operating station; means for rotating said retaining means; radially expansible and contractible electrical conductor means carried by said frame in axial alignment with said retaining means and adapted to be encompassed by the tubular work piece, said electrical conductor means being expansible into engagement with the interior of the work piece and being contractible out of engagement therewith to provide for removal of the work piece from the retaining means; means for expanding and contracting said electrical conductor means; a welding tool carried by said frame adjacent said operating station and externally of the tubular work piece and movable radially relative thereto between said extended and retracted positions, said tool being adapted to engage the exterior of the work piece radially opposite said electrical conductor means when it is in said extended position, and being spaced from the work piece when it is in said retracted position; and means for moving said tool between said extended and retracted positions.

4. An apparatus according to claim 3 wherein said tool includes two series-connected electrodes, whereby current flows from one of said electrodes through the work piece, through said electrical conductor means and through the work piece again to the other of said electrodes when said tool is in said extended position and when said electrical conductor means is expanded.

5. In a welding apparatus, the combination of: a frame providing an operating station; retaining means carried by said frame adjacent said operating station for holding a tubular work piece, said retaining means being rotatable about the axis of the tubular work piece to move successive portions of the work piece to said operating station; means for rotating said retaining means; at least two axially spaced, radially expansible and contractible backing structures in axial alignment with said retaining means and carried by said retaining means so as to be rotatable therewith, said backing structures being adapted to be encompassed by the work piece, each of said backing structures including electrical conductor means adapted to engage the interior of the work piece, and each of said backing structures being expansible to move the electrical conductor means thereof into engagement with the interior of the work piece and being contractible to move the electrical conductor means thereof out of engagement with the work piece to provide for removal of the work piece from said retaining means; means for expanding and contracting said backing structures; a number of welding tools equal to the number of backing structures carried by said frame adjacent said operating station and externally of the work piece and movable radially relative thereto between extended and retracted positions, said tools being spaced apart axially of the work piece, being adapted to engage the exterior of the work piece radially opposite said backing structures, respectively, when in their extended positions, and being spaced from the work piece when in their retracted positions; and means for moving said tools between said extended and retracted positions.

6. An apparatus according to claim 5 wherein each of said backing structures includes a plurality of radially movable segments and wherein the means for expanding and contracting each of said backing structures includes cam means engageable with all of the segments thereof.

7. An apparatus according to claim 5 wherein said retaining means includes a pair of axially spaced, axially movable retainers each carrying at least one of said backing structures, said retainers being adapted to receive the work piece therebetween.

8. An apparatus according to claim 7 wherein each of said backing structures includes a plurality of radially movable segments and wherein the means for expanding and contracting each of said backing structures includes cam means engageable with all of the segments thereof.

9. An apparatus according to claim 5 including three backing structures each having a plurality of radially movable segments, the radially movable segments of two of said backing structures being carried by common pivoted arms carried by said retaining means.

10. An apparatus as defined in claim 9 wherein the means for expanding and contracting said backing structures includes cam means engageable with all of said pivoted arms for expanding said two backing structures, and includes another cam means engageable with all of the radially movable segments of the third backing structure for expanding said third backing structure.

11. An apparatus as defined in claim 10 wherein said retaining means includes two axially spaced, axially movable retainers adapted to receive the work piece therebetween, said two backing structures and said cam means for expanding same being carried by one of said retainers and said third backing structure and said cam means for expanding same being carried by the other of said retainers.

12. In an apparatus of the character described, the combination of: retaining means for a tubular work piece; two radially expansible and contractible backing structures in axial alignment with said retaining means and adapted to be encompassed by the work piece; said backing structures being expansible into engagement with the interior of the work piece and being contractible out of engagement therewith, said backing structures being axially spaced from each other and each including a plurality of radially movable segments; a plurality of radially movable members each carrying one of said segments of one of said backing structures and one of said segments of the other of said backing structures; and cam means engaging said members for expanding and contracting said backing structures.

13. In an apparatus of the character described, the combination of: retaining means for a tubular work piece including two axially spaced, axially movable retainers adapted to receive the work piece therebetween; three backing structures one carried by one of said retainers and the other two carried by the other of said retainers, each of said backing structures being radially expansible and contractible and including a plurality of radially movable segments, the radially movable segments of said two backing structures being carried by pivoted arms on said other retainer, said backing structures being expansible into engagement with the interior of the work piece and contractible out of engagement therewith; cam means engageable with said segments of said one backing structure for expanding said one backing structure; and another cam means engageable with said pivoted arms for expanding said two backing structures.

14. An apparatus according to claim 13 including resilient means operatively connected to said segments of said one backing structure and resilient means operatively connected to said pivoted arms for contracting said backing structures.

15. An apparatus as defined in claim 13 wherein the cam means first mentioned includes an axially movable cam encompassed by and engageable with said segments of said one backing structure, and wherein said other cam means includes an axially movable cam encompassed by and engageable with said pivoted arms.

16. An apparatus as defined in claim 15 including a frame and means for rotatably mounting said retainers on said frame.

17. In an apparatus for welding a tubular work piece at three axially spaced points, the combination of: three axially spaced, expansible and contractible backing structures insertable into the work piece; means for expanding and contracting said backing structures; three axially spaced, extensible and retractable welding tools engageable with the work piece opposite said backing structures, respectively, and each including two series-connected electrodes; and means for extending and retracting said welding tools.

JOHN H. ABBOTT.

REFERENCES CITED

The following references are of record in the file of this patent:

UNITED STATES PATENTS

| Number | Name | Date |
| --- | --- | --- |
| 2,468,001 | Taylor et al. | Apr. 19, 1949 |
| 2,498,905 | Abbott | Feb. 28, 1950 |